(12) United States Patent
Toyoshima et al.

(10) Patent No.: US 8,001,166 B2
(45) Date of Patent: Aug. 16, 2011

(54) METHODS AND APPARATUS FOR OPTIMIZING KEYWORD DATA ANALYSIS

(75) Inventors: Hirobumi Toyoshima, Machida (JP); Daisuke Takuma, Sagamihara (JP); Hiroki Oya, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 12/057,559

(22) Filed: Mar. 28, 2008

(65) Prior Publication Data

US 2009/0248628 A1 Oct. 1, 2009

(51) Int. Cl.
*G06F 17/30* (2006.01)
*G06F 17/00* (2006.01)
*G06Q 10/00* (2006.01)

(52) U.S. Cl. .......................... 707/899; 706/61; 705/1.1

(58) Field of Classification Search .................. None
See application file for complete search history.

(56) References Cited

U.S. PATENT DOCUMENTS

| | | | | |
|---|---|---|---|---|
| 6,289,108 B1 * | 9/2001 | Rhoads | .......................... | 382/100 |
| 6,343,138 B1 * | 1/2002 | Rhoads | .......................... | 382/100 |
| 6,363,159 B1 * | 3/2002 | Rhoads | .......................... | 382/100 |
| 6,400,827 B1 * | 6/2002 | Rhoads | .......................... | 382/100 |
| 7,082,411 B2 * | 7/2006 | Johnson et al. | .................. | 705/37 |
| 7,415,129 B2 * | 8/2008 | Rhoads | .......................... | 382/100 |
| 2004/0102980 A1 * | 5/2004 | Reed et al. | .......................... | 705/1 |
| 2005/0055275 A1 * | 3/2005 | Newman et al. | ................. | 705/14 |

* cited by examiner

*Primary Examiner* — Susan Y Chen
(74) *Attorney, Agent, or Firm* — Erin C. Ming; Ryan, Mason & Lewis, LLP

(57) ABSTRACT

Techniques for analyzing keyword data for quality management purposes are provided. One or more keywords are selected. Each of the one or more keywords represent a category of quality management. A keyword time series is prepared for each of the one or more selected keywords. A set of fixed form time series is prepared for each of the one or more selected keywords. The set of fixed form time series comprises one or more fixed form time series representing statistical data related to the one or more selected keywords. One or more correction sets comprising one or more correction parameters are obtained. Each of the one or more correction parameters correspond to one of the one or more fixed form time series within each set of fixed form time series. A set of corrected time series is generated for each of the one or more correction sets. The set of corrected time series comprises a combination of the keyword time series and the set of fixed form time series for each of the one or more selected keywords, the combination being in accordance with the one or more correction sets. A similarity score is calculated for each set of corrected time series. The set of corrected time series with the highest similarity score is selected. The selected set of corrected time series comprises optimized keyword data for quality management purposes.

16 Claims, 8 Drawing Sheets

800

METHODS AND APPARATUS FOR OPTIMIZING KEYWORD DATA ANALYSIS

FIELD OF THE INVENTION

The present invention relates to data mining and, more particularly, to techniques for analyzing keyword data.

BACKGROUND OF THE INVENTION

In the field of quality and claim management, managers are alerted when there are sudden increases in particular words and/or phrases (e.g., keywords) in communications data (e.g., customer complaints or comments). Conventional systems, such as IBM OmniFind Analytics Edition® (OAE), process text data and analyze keywords according to relevance and frequency. The analysis is used to detect problems related to a specific topic. Conventional systems operate by time stamping incoming communications (e.g., documents) and extracting keywords from the documents. A text mining index is then created which allows a manager to calculate the number of documents comprising a keyword within a specific time period. When a rapid increase in keywords is detected over a period of time, managers are alerted to investigate the issue.

One drawback of this arrangement is that an increase in keywords over a period of time may not indicate an essential problem. For example, an increase in the frequency of a keyword in communications as related to an increase in the number of sales of a product identified by that keyword may not necessarily indicate a fault or a complaint. Therefore, managers are falsely alerted if keyword data is analyzed based solely on an increase in frequency of keywords.

At present, false alerts are prevented through manual analysis and correction of keyword data based on experience. In the above example, managers would generally correlate that the increase in keyword frequency was directly related to an increase in the number of sales and therefore, there is no cause for concern. However, there is no consistent or accurate means of optimizing the accuracy of keyword data.

SUMMARY OF THE INVENTION

An illustrative embodiment of the present invention meets the above-noted needs by providing techniques for optimizing keyword data analysis. These techniques offer several advantages over conventional methodologies, including: (i) incorporating supplemental fixed form time series data (e.g., sales rate of a product, failure rate of a product) to keyword time series data to validate the significance of the keyword time series data; (ii) decreasing the likelihood of misinterpreting keyword time series data; and (iii) offering a systematic and consistent method of optimizing keyword time series data.

In a first aspect of the invention, a method for analyzing keyword data for quality management purposes is provided. One or more keywords are selected. Each of the one or more keywords represent a category of quality management. A keyword time series is prepared for each of the one or more selected keywords. A set of fixed form time series is prepared for each of the one or more selected keywords. The set of fixed form time series comprises one or more fixed form time series representing statistical data related to the one or more selected keywords. One or more correction sets comprising one or more correction parameters is obtained. Each of the one or more correction parameters correspond to one of the one or more fixed form time series within each set of fixed form time series. A set of corrected time series is generated for each of the one or more correction sets. The set of corrected time series comprises a combination of the keyword time series and the set of fixed form time series for each of the one or more selected keywords. The combination is in accordance with the one or more correction sets. A similarity score is calculated for each set of corrected time series. The set of corrected time series with the highest similarity score is selected. The selected set of corrected time series comprises optimized keyword data for quality management purposes.

In one embodiment of the present invention, the one or more keywords may be selected from a text communication and/or a verbal communication. Also, the keyword time series may be a representation of an occurrence of the one or more selected keywords over a period of time. Further, the one or more fixed form time series may represent at least one of a sales rate of a product and a failure rate of a product.

In accordance with an additional embodiment of the present invention, the step of generating a set of corrected time series for each of the one or more correction sets may comprise the steps of calibrating the keyword time series and the one or more fixed form time series of the set of fixed form time series in accordance with a window of time, and multiplying the keyword time series to each of the one or more fixed form time series. The one or more fixed form time series may be raised by a power in accordance with the one or more correction parameters. In an alternative embodiment, the one or more correction parameters may be real numbers. Further, the one or more correction parameters may be user defined.

In another embodiment of the present invention, the similarity score may be calculated using an inner product and/or a square error equation. Also, at least one entity may be alerted of a quality management issue using the selected set of corrected time series.

In a second aspect of the present invention, an article of manufacture for analyzing keyword data for quality management purposes comprises a computer readable storage medium identified by one or more programs, which when executed by a computer implement the above steps.

In a third aspect of the invention, an apparatus for analyzing keyword data for quality management purposes comprises a memory and at least one processor coupled to the memory and operative to: (i) select one or more keywords, wherein each of the one or more keywords represent a category of quality management; (ii) prepare a keyword time series for each of the one or more selected keywords; (iii) prepare a set of fixed form time series for each of the one or more selected keywords, wherein the set of fixed form time series comprises one or more fixed form time series representing statistical data related to the one or more selected keywords; (iv) obtain one or more correction sets comprising one or more correction parameters, wherein each of the one or more correction parameters correspond to one of the one or more fixed form time series within each set of fixed form time series; (v) generate a set of corrected time series for each of the one or more correction sets, wherein the set of corrected time series comprises a combination of the keyword time series and the set of fixed form time series for each of the one or more selected keywords, the combination being in accordance with the one or more correction sets; (vi) calculate a similarity score for each set of corrected time series; and (vii) select the set of corrected time series with the highest similarity score. The selected set of corrected time series comprises optimized keyword data for quality management purposes.

In accordance with a fourth aspect of the present invention, a system for analyzing keyword data for quality management purposes is provided. The system comprises a database comprising one or more communications regarding quality management and at least one server operatively coupled to the database. The at least one server is operative to: (i) select one or more keywords from the one or more communications, wherein each of the one or more keywords represent a category of quality management; (ii) prepare a keyword time series for each of the one or more selected keywords; (iii) prepare a set of fixed form time series for each of the one or more selected keywords, wherein the set of fixed form time series comprises one or more fixed form time series representing statistical data related to the one or more selected keywords; (iv) obtain one or more correction sets comprising one or more correction parameters, wherein each of the one or more correction parameters correspond to one of the one or more fixed form time series within each set of fixed form time series; (v) generate a set of corrected time series for each of the one or more correction sets, wherein the set of corrected time series comprises a combination of the keyword time series and the set of fixed form time series for each of the one or more selected keywords, the combination being in accordance with the one or more correction sets; (vi) calculate a similarity score for each set of corrected time series; and (vii) select the set of corrected time series with the highest similarity score. The selected set of corrected time series comprises optimized keyword data for quality management purposes.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described in conjunction with exemplary methods for analyzing keyword data for quality management purposes. It should be understood, however, that the invention is not limited to the particular embodiments described herein. The principles of this invention are generally applicable to any technique used for keyword analysis, and modifications to the illustrative embodiments will become apparent to those skilled in the art given the teachings described herein.

The term "quality management" as used herein is intended to be construed broadly so as to encompass, by way of example and without limitation, the act of overseeing the effectiveness and efficiency of a product or service. By way of example, quality management may include monitoring customer complaints or frequently asked questions (FAQs), or identifying defects in a product.

The term "keyword data" as used herein is intended to be construed broadly so as to encompass, by way of example and without limitation, information related to a word or concept with special significance.

The term "time series" as used herein is intended to be construed broadly so as to encompass, by way of example and without limitation, a collection of successive data represented over a period of time.

The term "keyword time series" as used herein is intended to be construed broadly so as to encompass, by way of example and without limitation, keyword data organized in successive time intervals over a period of time.

The term "fixed form time series" as used herein is intended to be construed broadly so as to encompass, by way of example and without limitation, statistical data (e.g., sales rate of a product, failure rate of a product) organized in successive time intervals over a period of time.

The term "correction parameter" as used herein is intended to be construed broadly so as to encompass, by way of example and without limitation, any value used to calibrate time series data.

Figure 1:
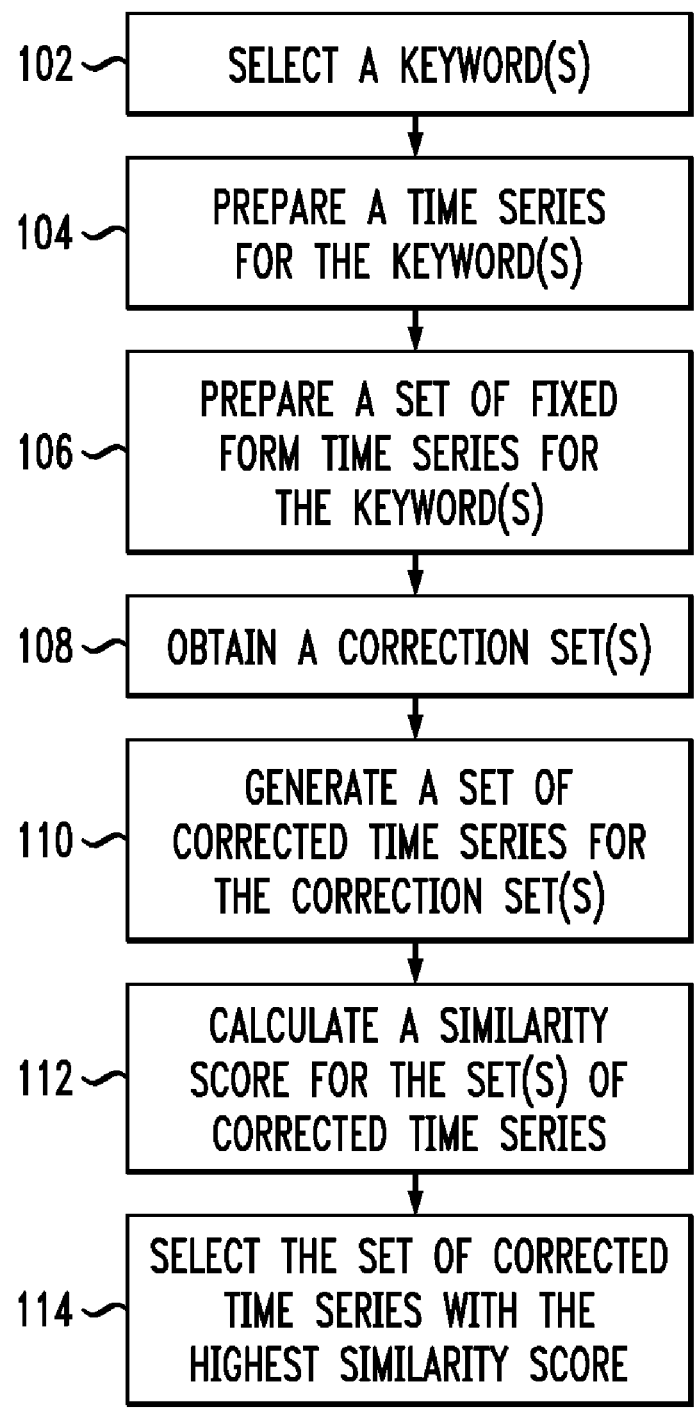
FIG. 1 is a flow diagram illustrating a methodology for analyzing keyword data for quality management purposes, according to an embodiment of the present invention.

Referring initially to FIG. 1, a flow diagram illustrates a methodology for analyzing keyword data for quality management purposes, according to an embodiment of the present invention. In an illustrative embodiment, methodology 100 is carried out by a quality management systems server or other computer-based device. Methodology 100 begins at step 102 where one or more keywords are selected. The keyword data may be obtained from communications (e.g., text or verbal communications) directed to quality management personnel. A keyword may be a model number of a product, a part number, etc. For instance, one keyword in the following communication, "I would like to purchase an IBM Thinkpad T43," is "T43."

After selecting one or more keywords, a keyword time series is prepared for each selected keyword at step 104. A keyword time series represents the number of times a keyword appears over a period of time. In an exemplary embodiment, each keyword is correlated to a time stamp of the communication from which the keyword was extracted. The keywords are then organized according to time of occurrence. For example, the keyword "T43" may have appeared fifty times in the month of January, one-hundred times in the month of February, and sixty times in the month of March. It is to be appreciated that the keyword time series data may be adjusted to any time period (e.g., minutes, hours, days, months, years, etc.).

At step 106, a set of fixed form time series data is prepared for each selected keyword. Typically, fixed form time series data comprises data maintained by quality management. Fixed form time series data is statistical data related to a given keyword over a period of time. Two examples of statistical data would be the number of sales for a given product and the failure rate of a given product. For example, two-hundred model "T43" Thinkpads have been sold in the month of January, fifty model "T43" Thinkpads have been sold in the month of February, and one-hundred fifty model "T43" Thinkpads have been sold in the month of March. Further, ten broken "T43" Thinkpads have been reported in the month of January, twenty-five broken "T43" Thinkpads have been reported in the month of February, and eight broken "T43" Thinkpads have been reported in the month of March. In this example, the set of fixed form time series for keyword "T43" would comprise both a sales time series and a failure rate time series. It is to be appreciated that fixed form time series data is not limited to the two types of statistical data described herein. Fixed form time series data may include any type of statistical data relevant to a keyword.

At step 108, one or more correction sets comprising one or more correction parameters are obtained. Correction parameters may be user defined values and they are used to calibrate fixed form time series data. Each correction parameter corresponds to a fixed form time series. Using the above fixed form time series example regarding number of sales (P) and failure rate (Q), a correction set for keyword "T43" may be the following: $(P, Q)_{T43}=(1, -1)$. In this example, for keyword "T43," the fixed form time series regarding the number of sales (P) will be calibrate by 1 and the fixed form time series regarding failure rate (Q) will be calibrate by -1. In an illustrative embodiment, more than one correction set is utilized, for example, $(P, Q)_{T43}=(1, -1); (-1, 1); (-1, -1); (0, -1); (2, -1); (-2, 0.5)$; a total of six correction sets. The way in which the correction parameters calibrate the fixed form time series will be discussed in greater detail below with reference to FIGS. 4-6.

At step 110, a set of corrected time series is generated for each correction set. A corrected time series is a calibrated time series in which a keyword time series is combined with its corresponding set of fixed form time series. Using the example above, the corrected time series for keyword "T43" using correction set (1, -1) is the keyword time series of "T43" combined with the set of fixed form time series corresponding to keyword "T43": (1) number of sales of "T43" calibrated by 1 and (2) failure rate of "T43" calibrated by -1. Further, if ten correction sets are utilized, there will be ten sets of corrected time series. Each set will contain a uniquely calibrated, corrected time series for keyword "T43." Also, if five keywords are used, each of the ten correction sets will have a corrected time series for each of the five keywords.

At step 112, a similarity score is calculated for each set of corrected time series. A similarity score is a mathematical comparison between the corrected time series within each set. The mathematical comparison will be described in greater detail below with reference to FIGS. 6-7. In an illustrative embodiment, if a set of corrected time series comprises five corrected time series (e.g., a corrected time series for keyword "ONE," a corrected time series for keyword "TWO," a corrected time series for keyword "THREE," a corrected time series for keyword "FOUR," and a corrected time series for keyword "FIVE"), the five corrected time series are compared to each other and a similarity score is calculated. Recall that each set of corrected time series comprise time series that have been calibrated with the same unique set of correction parameters.

The set of corrected time series with the highest similarity score is then selected at step 114. This selected time series represents optimized keyword data which should be used for keyword analysis. Unlike conventional keyword data, the proposed optimized keyword data is more significant and reliable because it incorporates calibrated statistical data (e.g., fixed form time series data).

In an additional embodiment, the optimized keyword data is automatically analyzed and management is alerted to a change in frequency of a keyword if the change is substantial and worth investigating.

Figure 2:
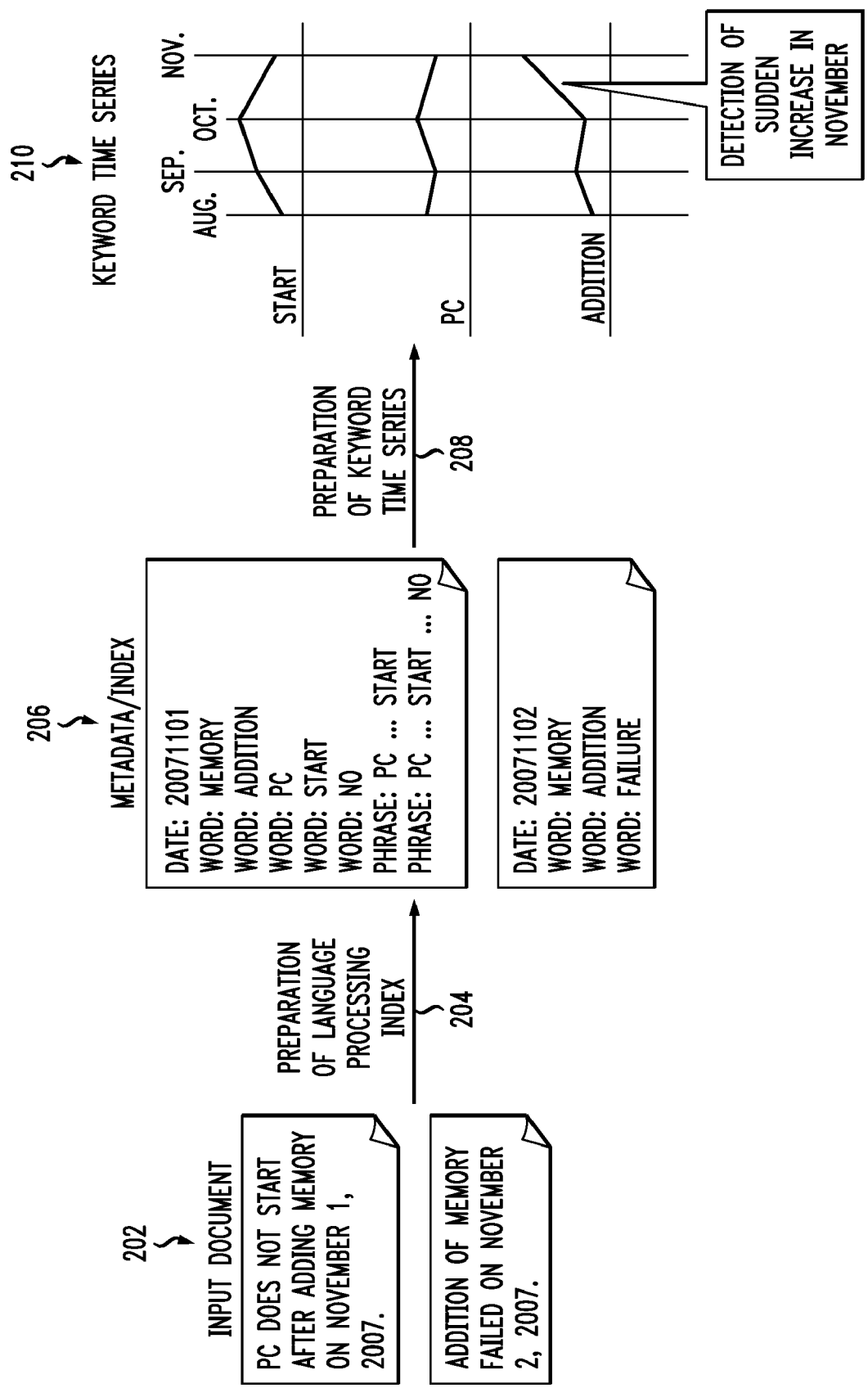
FIG. 2 is an exemplary embodiment of generating keyword time series data, in accordance with an embodiment of the present invention.

Referring now to FIG. 2, an exemplary embodiment of generating keyword time series data is provided, in accordance with an embodiment of the present invention. FIG. 2 illustrates one embodiment of step 104 of methodology 100. As discussed above, keyword data is extracted from textual or verbal communications. In this example, two input documents 202 are illustrated: "PC does not start after adding memory on Nov. 1, 2007" and "Addition of memory failed on Nov. 2, 2007." In an illustrative embodiment, a quality management systems server prepares a language processing index using the two documents 202 at flow 204. The index 206 contains keywords from the documents which are arranged according to date. At flow 208, the server then prepares multiple keyword time series 210 for certain keywords. In this example, keyword time series are prepared for keywords, "Start," "PC," and "Addition." Between the three keyword time series, there is a sudden increase in the keyword "Addition" in November.

In an additional embodiment, table 1 illustrates an exemplary method of organizing keyword data:

TABLE 1

| Document ID | Date | Text | Extracted keywords |
|---|---|---|---|
| E-mail 1 | 2007/09/30 | T40 is broken. | T40, broken |
| E-mail 2 | 2007/10/01 | Want to buy T43. | T43, buy |
| ... | ... | ... | ... |

Table 1 organizes keyword data by document ID, date, text, and extracted keywords. The data of table 1 may then be converted into keyword time series data as illustrated by table 2:

TABLE 2

| | Date 1 | Date 2 | Date 3 | Date 4 |
|---|---|---|---|---|
| Time series of "T40" | 0 | 0 | 500 | 500 |
| Time series of "T43" | 500 | 1000 | 1200 | 1500 |
| ... | ... | ... | ... | ... |

Table 2 shows the frequency of keyword "T40" and "T43" over a period of time (e.g., Date 1, Date 2, Date 3, and Date 4). The data of table 2 may also be presented in graphical form.

Figure 3:
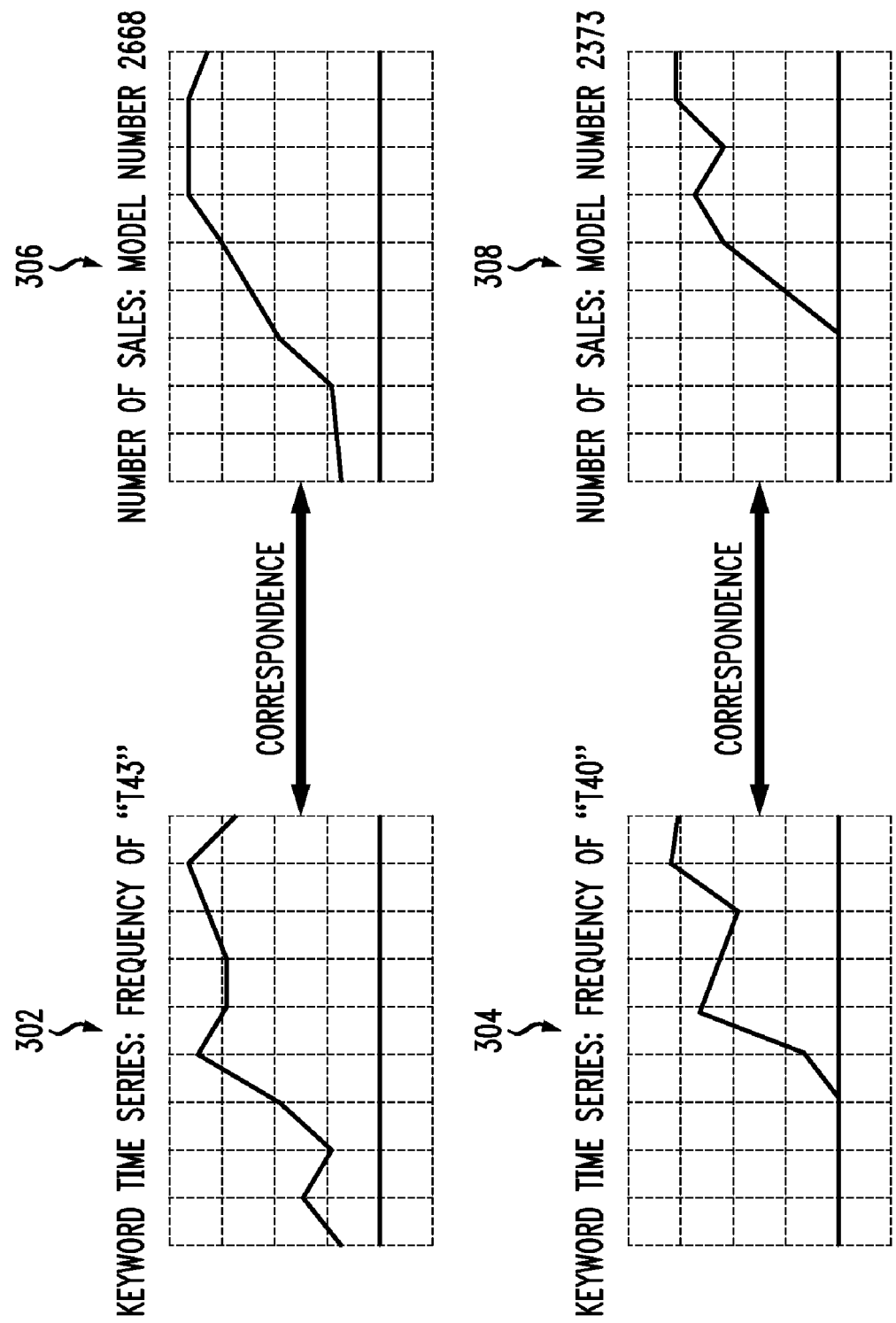
FIG. 3 is a diagram illustrating the correlation between a keyword time series and a fixed form time series (e.g., number of sales) for a given keyword, in accordance with an embodiment of the present invention.

Referring now to FIG. 3, a diagram illustrates the correlation between a keyword time series and a fixed form time series (e.g., number of sales) for a given keyword, in accordance with an embodiment of the present invention. FIG. 3 illustrates one aspect of step 106 of methodology 100. Typically, statistical data (e.g., fixed form time series data) is not directly correlated with a keyword. For example, a Thinkpad "T43" may be known as model number 2668 in the statistical database or Thinkpad "T40" may be known as model number 2373. In an illustrative embodiment, keywords are mapped to corresponding statistical data. In this example, the keyword time series for keyword "T43" (302) corresponds to the fixed form time series (e.g., number of sales) of model number 2668 (306) and the keyword time series for keyword "T40" (304) corresponds to the fixed form time series (e.g., number of sales) of model number 2373 (308).

Figure 4:
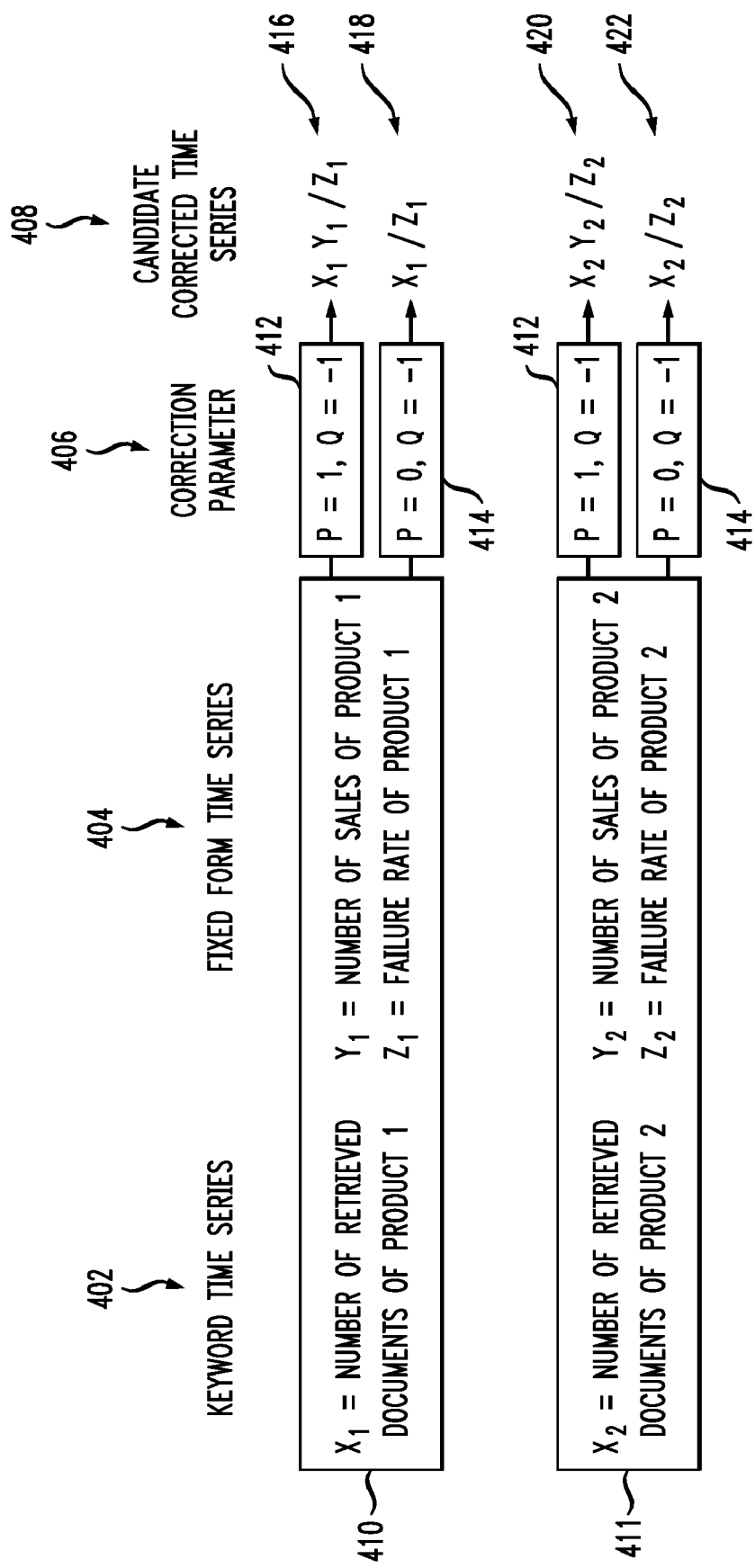
FIG. 4 is an exemplary embodiment of generating a corrected time series, in accordance with an embodiment of the present invention.

Referring now to FIG. 4, an exemplary embodiment of generating a corrected time series is presented, in accordance with an embodiment of the present invention. FIG. 4 illustrates steps 108 to 110 of methodology 100. The process of generating corrected time series may be broken down into two stages. The first stage is a time series pretreatment stage and the second stage is a compound preparation stage.

In a preferred embodiment of the present invention, a candidate corrected time series 408 is equal to a keyword time series 402 combined with fixed form time series 404 calibrated by correction parameters 406. In the example of FIG. 4, $X_1$ equals the number of retrieved documents of product 1 (e.g., keyword time series data of keyword "product 1"), $Y_1$ equals the number of sales of product 1, and $Z_1$ equals the failure rate of product 1. Further, $X_2$ equals the number of retrieved documents of product 2 (e.g., keyword time series data of keyword "product 2"), $Y_2$ equals the number of sales of product 2, and $Z_2$ equals the failure rate of product 2. The keyword time series and fixed form time series of product 1 will be combined 410 and the keyword time series and fixed form time series of product 2 will be separately combined 411.

Before a group (e.g., 410, 411) can be combined, the multiple time series of a given group may need to undergo a pretreatment. In this example, each combination contains three time series and each time series may contain data over different periods of time. In order to combine the multiple time series, the time series must be subjected to parallel translation so that all the time series originate at the same time and end at the same time. One way of accomplishing this is to trim off the front-end and the back-end of a time series if no significant data is present. For example, if the number of sales for a product is zero from January to April, the time series for sales should be trimmed to May. Further, the keyword time series and the time series for failure rate should also be trimmed to May to make the time periods uniform. It should be noted that trimming may not be necessary in certain circumstances. In one instance, the time series for sales and the time series for failure rate should be parallel because failure rate implicitly begins on the sales start date.

After the pretreatment stage, each combination (410, 411) undergoes compound preparation. This involves calibrating the fixed form time series of each combination in accordance with a set of correction parameters (e.g., 412 and 414). The technique of calibrating and combining the time series is not limited to one method. In a preferred embodiment, the number of correction parameters in each correction parameter set (412, 414) corresponds to the number of fixed form time series, and each correction parameter represents a calibrating exponent for the values of the corresponding fixed form time series.

In this example, there are two correction sets: (P, Q)=(1, −1); (0, −1). However, more than two may be used. Correction set 412 comprises correction parameters (P, Q) where P=1 and Q=−1. Correction set 414 comprises correction parameters where P=0 and Q=−1. Correction parameter P corresponds to the number of sales of product ($Y_i$) and correction parameter Q corresponds to the failure rate of product ($Z_i$), where i indicates the product number (e.g., keyword). In an illustrative embodiment, correction parameters P and Q calibrate the fixed form time series by acting as an exponent of $Y_i$ and $Z_i$, respectively. For instance, when P=1 and Q=−1, the values of the corrected times series equal $X_i \times Y_i^1 \times Z_i^{-1}$, or $X_i Y_i / Z_i$. Further, when P=0 and Q=−1, the values of the corrected times series equal $X_i \times Y_i^0 \times Z_i^{-1}$, or $X_i / Z_i$. Two additional examples include:

if $(P, Q)=(2, -1) \rightarrow C_i[t]=X_i[t] \times Y_i[t]^2 / Z_i[t]$, and if $(P, Q)=(1, 0.5) \rightarrow C_i[t]=X_i[t] \times Y_i[t] \times \sqrt{Z_i[t]}$;

where:
C is the corrected time series,
t is a time value, and
[ ] is an index.

However, it should be noted that the calibration is not limited to this one type of mathematical operation, and one or more types of operations may be used.

As illustrated in FIG. 4, $X_1$, $Y_1$, and $Z_1$ (410) will be combined in accordance with correction set 412 to create corrected time series 416, and $X_1$, $Y_1$, and $Z_1$ (410) will be combined in accordance with correction set 414 to create corrected time series 418. Furthermore, $X_2$, $Y_2$, and $Z_2$ (411) will be combined in accordance with correction set 412 to create corrected time series 420, and $X_2$, $Y_2$, and $Z_2$ (410) will be combined in accordance with correction set 414 to create corrected time series 422. In this exemplary embodiment, there will be two sets of corrected time series in the end. One set of corrected time series will comprise the corrected time series generated with correction parameters 412 and the other set of corrected time series will comprise the corrected time series generated with correction parameters 414 (e.g., one set will comprise 416 and 420 and the other set will comprise 418 and 422). It should be appreciated that the present invention is not limited to two keyword time series, two types of fixed form time series, and two sets of correction parameters as depicted in the above example. Any number of keyword time series, fixed form time series, and correction parameters may be used.

Figure 5:
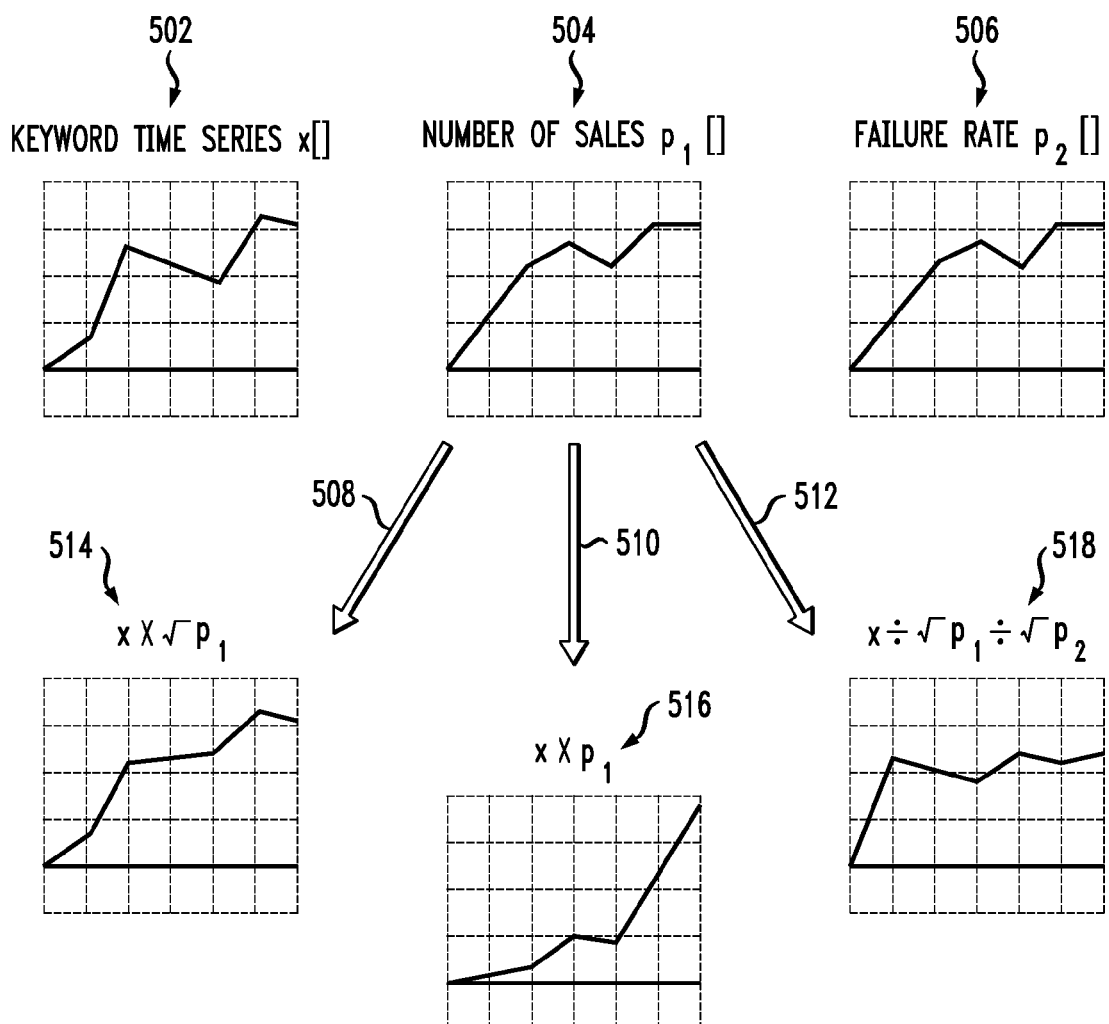
FIG. 5 is an exemplary embodiment of combining a keyword time series with two fixed form time series (e.g., number of sales and failure rate) using three sets of correction parameters, in accordance with an embodiment of the present invention.

Referring now to FIG. 5, an exemplary embodiment of combining a keyword time series with two fixed form time series (e.g., number of sales and failure rate) using three sets of correction parameters is provided, in accordance with an embodiment of the present invention. Keyword time series 502 is combined with two fixed form time series: number of sales 504 and failure rate 506. The three time series are combined three times using three different sets of correction parameters (508, 510, 512). Each combination yields a different corrected time series (514, 516, 518).

Figure 6:
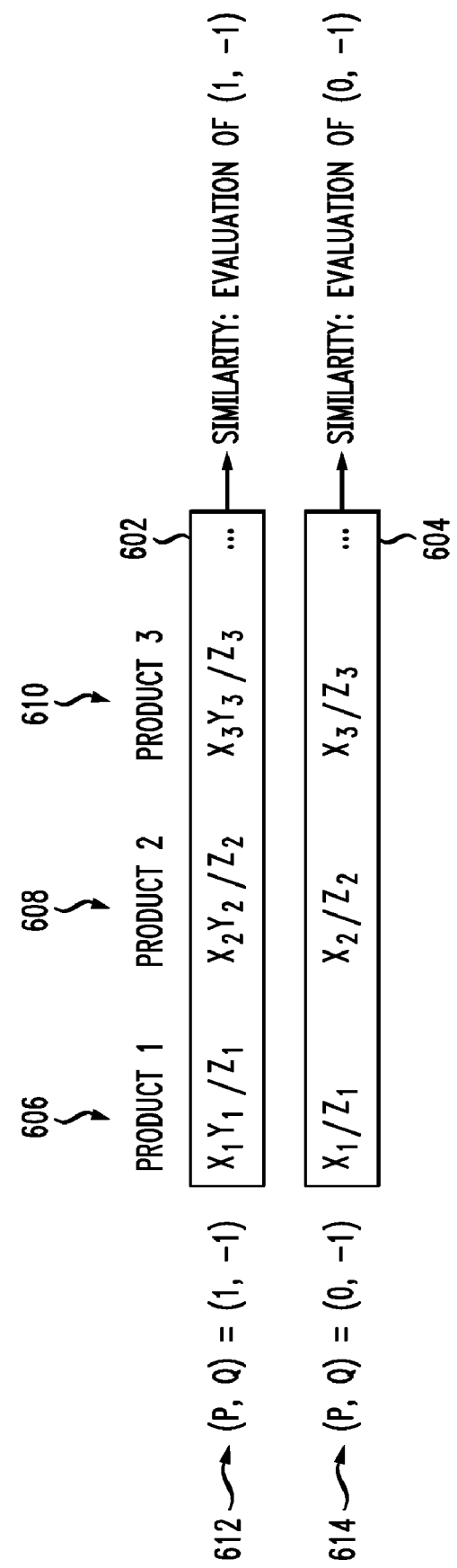
FIG. 6 is a diagram illustrating the grouping of corrected time series for a similarity evaluation, in accordance with an embodiment of the present invention.

Referring now to FIG. 6, a diagram illustrates the grouping of corrected time series for a similarity evaluation, in accordance with an embodiment of the present invention. In order to carry out a similarity evaluation, a corrected time series is grouped under the set of correction parameters used to create the corrected time series. In this example, corrected time series set 602 comprises corrected time series for product 1 (606), product 2 (608), and product 3 (610). All of the corrected time series of set 602 were created with correction parameter set 612. Further, corrected time series set 604 comprises corrected time series for product 1 (606), product 2 (608), and product 3 (610). All of the corrected time series of set 604 were created with correction parameter set 614. After the corrected time series are grouped, the time series in each group are compared to each other and a similarity score is calculated. Calculating similarity is discussed below with reference to FIG. 7.

Figure 7:
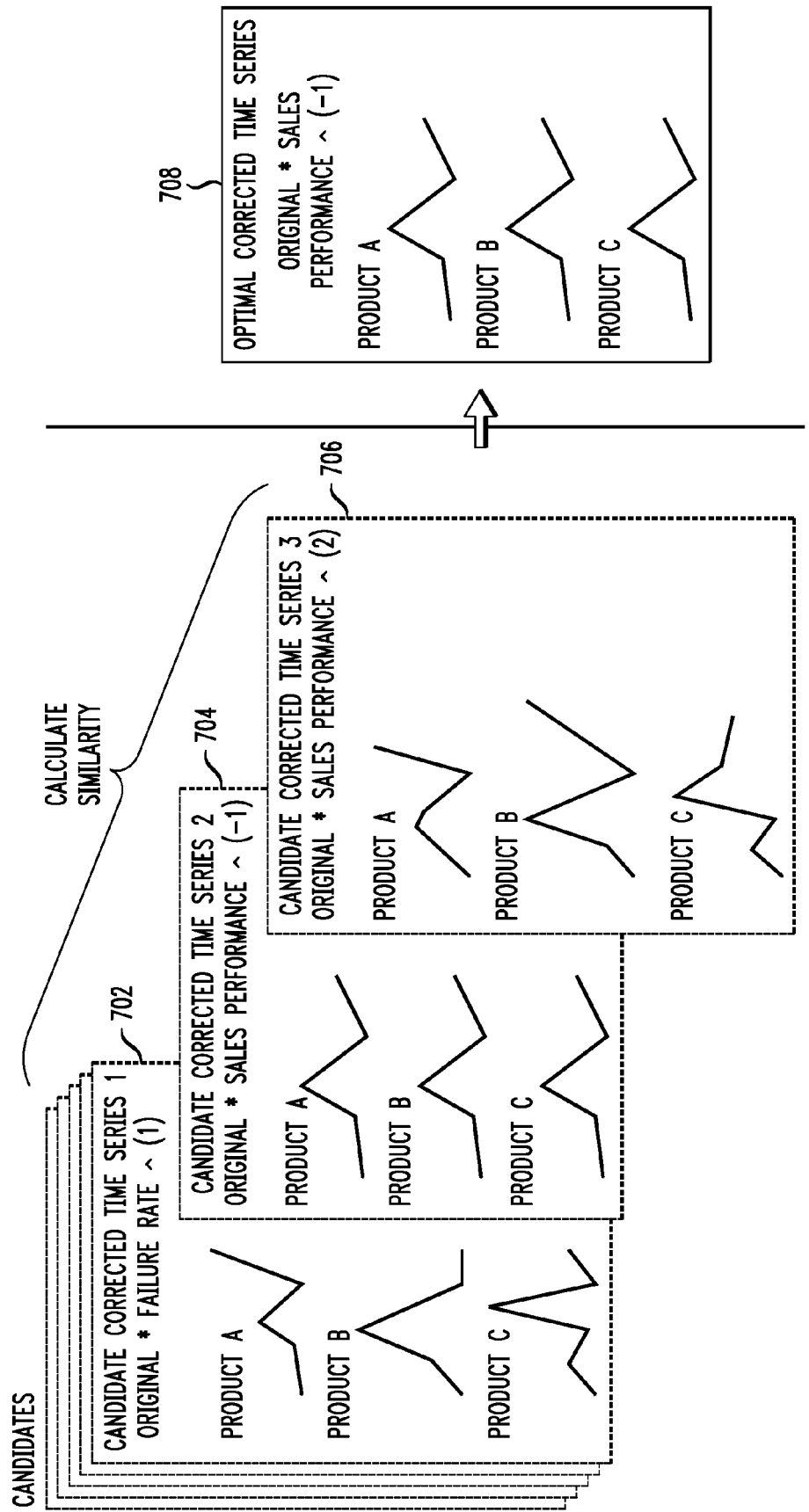
FIG. 7 is a diagram illustrating the selection of the set of corrected time series with the highest similarity score, in accordance with an embodiment of the present invention.

Referring now to FIG. 7, a diagram illustrates the selection of the set of corrected time series with the highest similarity score, in accordance with an embodiment of the present invention. As discussed above, a similarity score for each set of generated corrected time series (702, 704, 706) is calculated, and the set with the highest similarity score is selected (708). Similarity may be calculated in many ways. In one embodiment, similarity is calculated using an inner product:

$$R[t]=(\Sigma_{k=1, 2, \ldots, N} C_k[t])/N, \text{ and}$$

$$\text{Similarity} = (\Sigma_{n=1,2,\ldots N} <R, C_k>/(\|R\|\cdot\|C_k\|));$$

where:
R is the average time series,
k is a keyword,
C is a corrected time series,
t is a time value, and
[ ] is an index.

This similarity is the angle between R and $C_k$ when the time series is considered a vector.

In an additional embodiment, similarity is calculated using a square error:

$$\text{Similarity} = \Sigma_{n=1,2,\ldots N} \|R - C_k\|;$$

where:
R is the average time series,
C is a corrected time series, and
k is a keyword.

This similarity is the distance between R and $C_k$ when the time series is considered a vector.

In general terms, the set of corrected time series comprising time series that are most similar to each other is selected, for example:

Correction parameter set (−1, 1) may yield corrected time series:
   $keyword_1$: 3, 6, 4, 8, 6, 19, 9
   $keyword_2$: 1, 4, 2, 6, 3, 16, 7
   :
   →similarity of 90%

Correction parameter set (−1, 2) may yield corrected time series:
   $keyword_1$: 3, 16, 2, 5, 1, 3, 0
   $keyword_2$: 1, 0, 14, 3, 3, 2, 6
   :
   →similarity of 15%

In this example, the first set of corrected time series is selected as the optimized time series.

The optimized time series is then used for quality management purposes. Typically, management is alerted when there is an increase in keyword frequency. There are a number of ways to calculate an increase in keywords. In an exemplary embodiment, the frequency of a keyword at a specific time is compared to the average frequency of the keyword over a period of time. For example, when the optimal corrected time series is specified as $S_k[t]$, where t=1, 2, . . . , T, and S is the selected time series, k is a keyword, t is a time value, and [ ] is an index, an increase in keyword k at time T may be determined as follows:

$$\text{If } Z[T] = \Sigma_k S_k[T], \{S_k[T]/(Z[T])\}/\{(\Sigma_{t=t-1,\ldots t-M} S_k[T])/(\Sigma_{t=t-1,\ldots t-M} Z[T])\},$$

where:
M is a time period, and
$\{(\Sigma_{t=t-1,\ldots t-M} S_k[T])/(\Sigma_{t=t-1,\ldots t-M} Z[T])\}$ is the average keyword frequency in the past, normalized by the frequency of all the keywords.

Figure 8:
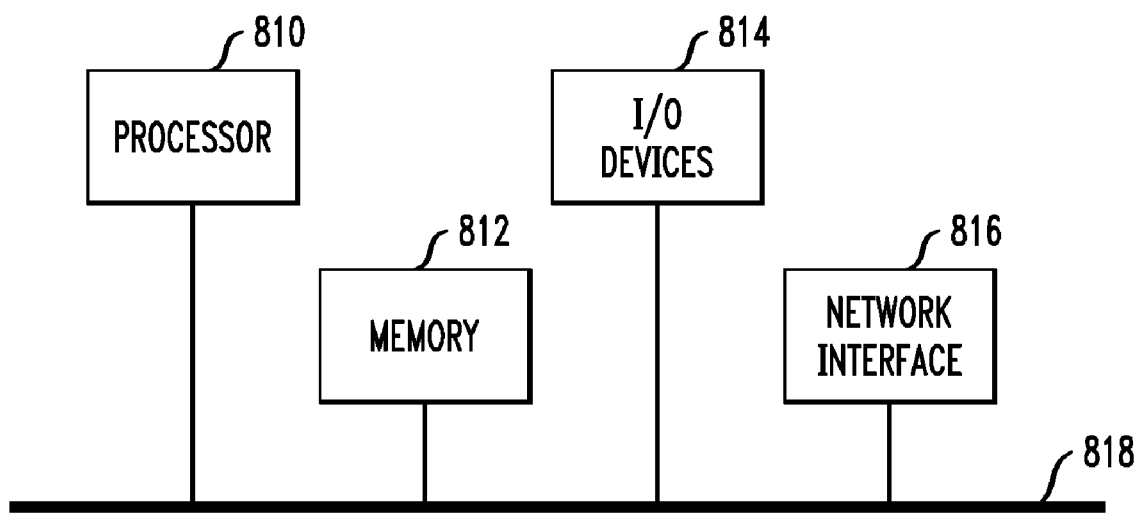
FIG. 8 is a diagram illustrating an illustrative hardware implementation of a computing system in accordance with which one or more components/methodologies of the present invention may be implemented, according to an embodiment of the present invention.

Referring now to FIG. 8, step diagram 800 illustrates an exemplary hardware implementation of a computing system in accordance with which one or more components/methodologies of the invention (e.g., components/methodologies described in the context of FIGS. 1-7) may be implemented, according to an embodiment of the present invention.

As shown, the techniques for analyzing keyword data for quality management purposes may be implemented in accordance with a processor 810, a memory 812, I/O devices 814, and a network interface 816, coupled via a computer bus 818 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

The invention claimed is:

1. A method for analyzing keyword data for quality management purposes, the method comprising:
automatically extracting one or more keywords, wherein each of the one or more keywords represent a category of quality management, the one or more keywords being extracted from at least one of a text communication and a verbal communication from at least one entity for a quality management purpose;
preparing a keyword time series for each of the one or more extracted keywords, wherein a keyword time series for a given extracted keyword comprises a number of times the given extracted keyword appears in a given period of time which is adjustable to any time period;
preparing a set of fixed form time series for each of the one or more extracted keywords, wherein a set of fixed form time series for a given extracted keyword comprises one or more fixed form time series representing statistical data related to the given extracted keyword over the given period of time;
obtaining one or more correction sets comprising one or more correction parameters, wherein each of the one or more correction parameters correspond to, and are used to calibrate, one of the one or more fixed form time series within each set of fixed form time series;
generating a set of corrected time series for each of the one or more correction sets, wherein a corrected time series comprises a calibrated time series in which a keyword time series for the given extracted keyword is combined with a corresponding set of fixed form time series for the given extracted keyword;

calculating a similarity score for each set of corrected time series, wherein a similarity score for a given set of corrected time series comprises a comparison measure between the corrected time series within the given set of corrected time series that have been calibrated with the same unique set of correction parameters; and selecting the set of corrected time series with the highest similarity score, wherein the selected set of corrected time series comprises optimized keyword data for quality management purposes.

2. The method of claim 1, wherein the one or more fixed form time series represent at least one of a sales rate of a product and a failure rate of a product.

3. The method of claim 1, wherein the one or more correction parameters are user defined.

4. The method of claim 1, wherein generating a set of corrected time series for each of the one or more correction sets further comprises:

calibrating the keyword time series and the one or more fixed form time series of the set of fixed form time series in accordance with a window of time; and multiplying the keyword time series to each of the one or more fixed form time series, wherein the one or more fixed form time series is raised by a power in accordance with the one or more correction parameters.

5. The method of claim 4, wherein the one or more correction parameters are real numbers.

6. The method of claim 1, wherein the similarity score is calculated using at least one of an inner product and a square error equation.

7. The method of claim 1, further comprising alerting at least one entity of a quality management issue using the selected set of corrected time series.

8. An article of manufacture for analyzing keyword data for quality management purposes, the article comprising a computer readable storage medium identified by one or more programs, which when executed by a computer implement the method of claim 1.

9. An apparatus for analyzing keyword data for quality management purposes, the apparatus comprising:

a memory; and at least one processor coupled to the memory and operative to:

automatically extract one or more keywords, wherein each of the one or more keywords represent a category of quality management, the one or more keywords being extracted from at least one of a text communication and a verbal communication from at least one entity for a quality management purpose;

prepare a keyword time series for each of the one or more extracted keywords, wherein a keyword time series for a given extracted keyword comprises a number of times the given extracted keyword appears in a given period of time which is adjustable to any time period;

prepare a set of fixed form time series for each of the one or more extracted keywords, wherein a set of fixed form time series for a given extracted keyword comprises one or more fixed form time series representing statistical data related to the given extracted keyword over the given period of time;

obtain one or more correction sets comprising one or more correction parameters, wherein each of the one or more correction parameters correspond to, and are used to calibrate, one of the one or more fixed form time series within each set of fixed form time series;

generate a set of corrected time series for each of the one or more correction sets, wherein a corrected time series comprises a calibrated time series in which a keyword time series for the given extracted keyword is combined with a corresponding set of fixed form time series for the given extracted keyword;

calculate a similarity score for each set of corrected time series, wherein a similarity score for a given set of corrected time series comprises a comparison measure between the corrected time series within the given set of corrected time series that have been calibrated with the same unique set of correction parameters; and select the set of corrected time series with the highest similarity score, wherein the selected set of corrected time series comprises optimized keyword data for quality management purposes.

10. The apparatus of claim 9, wherein the one or more fixed form time series represent at least one of a sales rate of a product and a failure rate of a product.

11. The apparatus of claim 9, wherein the one or more correction parameters are user defined.

12. The apparatus of claim 9, wherein the at least one processor is further operative to:

calibrate the keyword time series and the one or more fixed form time series of the set of fixed form time series in accordance with a window of time; and multiply the keyword time series to each of the one or more fixed form time series, wherein the one or more fixed form time series is raised by a power in accordance with the one or more correction parameters.

13. The apparatus of claim 12, wherein the one or more correction parameters are real numbers.

14. The apparatus of claim 9, wherein the similarity score is calculated using at least one of an inner product and a square error equation.

15. The apparatus of claim 9, wherein the at least one processor is further operative to alert at least one entity of a quality management issue using the selected set of corrected time series.

16. A system for analyzing keyword data for quality management purposes, the system comprising:

a database comprising one or more communications regarding quality management; and at least one server operatively coupled to the database, the at least one server being operative to:

automatically extract one or more keywords from the one or more communications, wherein each of the one or more keywords represent a category of quality management, the one or more keywords being extracted from at least one of a text communication and a verbal communication from at least one entity for a quality management purpose;

prepare a keyword time series for each of the one or more extracted keywords, wherein a keyword time series for a given extracted keyword comprises a number of times the given extracted keyword appears in a given period of time which is adjustable to any time period;

prepare a set of fixed form time series for each of the one or more extracted keywords, wherein a set of fixed form time series for a given extracted keyword comprises one or more fixed form time series representing statistical data related to the given extracted keyword over the given period of time;

obtain one or more correction sets comprising one or more correction parameters, wherein each of the one or more correction parameters correspond to, and are used to calibrate, one of the one or more fixed form time series within each set of fixed form time series;

generate a set of corrected time series for each of the one or more correction sets, wherein a corrected time series comprises a calibrated time series in which a keyword time series for the given extracted keyword is combined with a corresponding set of fixed form time series for the given extracted keyword;

calculate a similarity score for each set of corrected time series, wherein a similarity score for a given set of corrected time series comprises a comparison measure between the corrected time series within the given set of corrected time series that have been calibrated with the same unique set of correction parameters; and select the set of corrected time series with the highest similarity score, wherein the selected set of corrected time series comprises optimized keyword data for quality management purposes.

* * * * *